July 2, 1929.  H. J. MURRAY ET AL  1,719,776
DIRECTION INDICATOR ATTACHMENT
Filed July 7, 1923   2 Sheets-Sheet 1
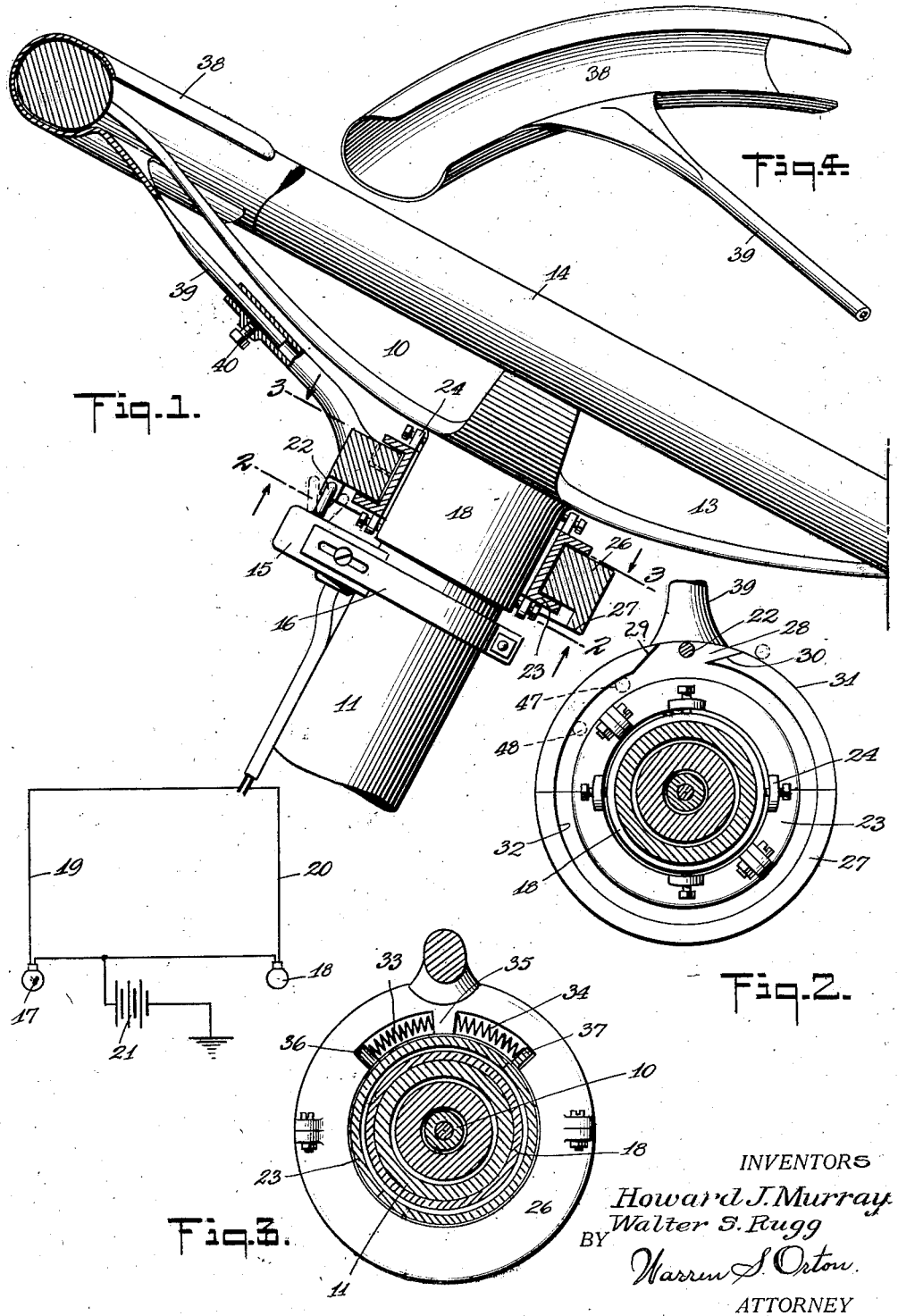
INVENTORS
Howard J. Murray
Walter S. Rugg
BY Warren S. Orton
ATTORNEY

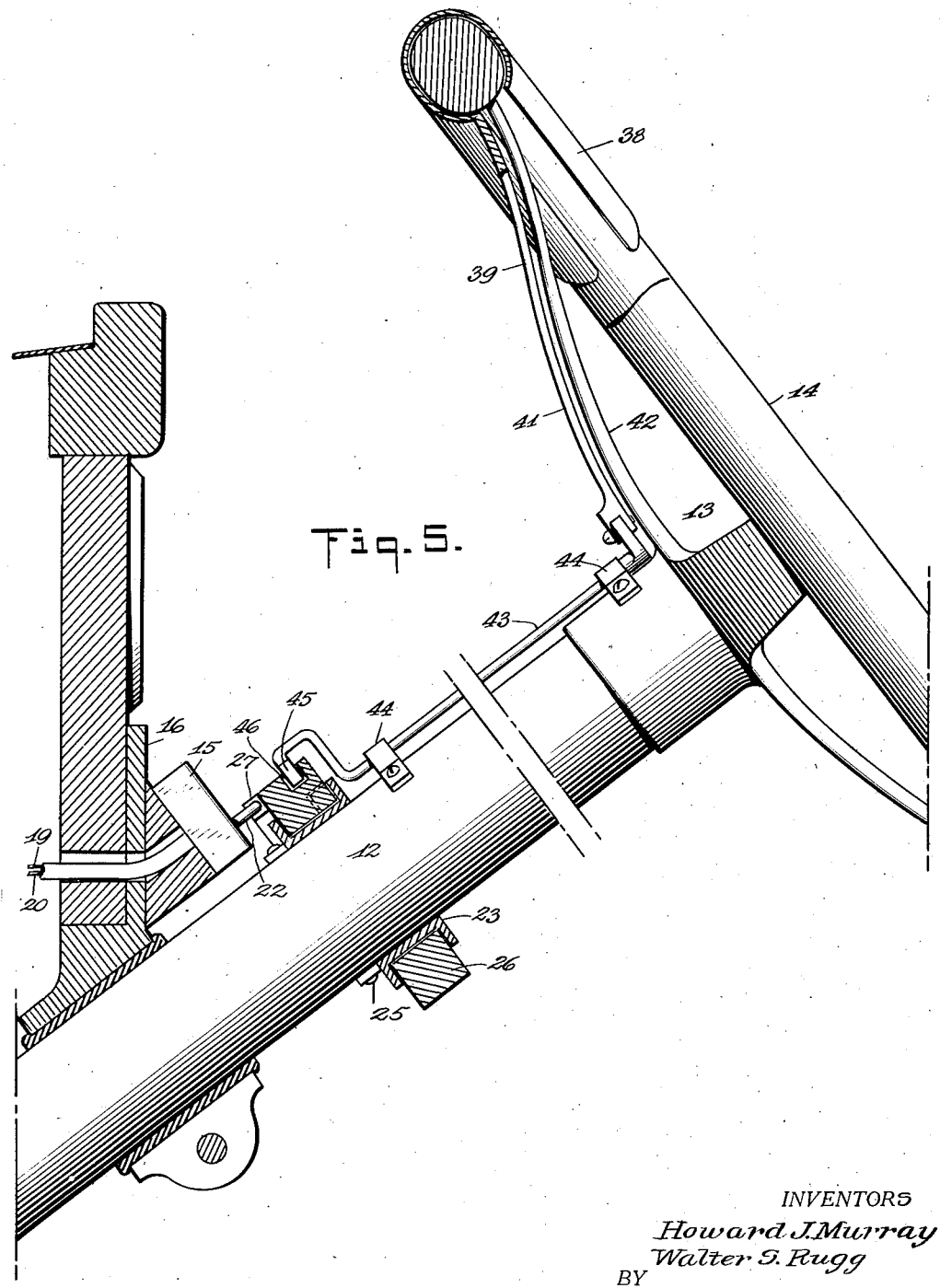

Patented July 2, 1929.

1,719,776

UNITED STATES PATENT OFFICE.

HOWARD J. MURRAY, OF BROOKLYN, NEW YORK, AND WALTER S. RUGG, OF PITTSBURGH, PENNSYLVANIA, ASSIGNORS TO R. M. COMPANY, INC., OF EAST PITTSBURGH, PENNSYLVANIA, A CORPORATION OF DELAWARE.

DIRECTION-INDICATOR ATTACHMENT.

Application filed July 7, 1923. Serial No. 650,010.

The invention relates to a signalling device of the type commonly found on automotive vehicles for the purpose of indicating the intent of the operator to turn to the right and left and constitutes a companion application with Serial No. 650,011 filed under even date.

An object of the invention is to provide a simple form of indicator or signal control which can be formed as a complete marketable article, and which will contain mounting parts designed so that the attachment can be secured to vehicles of different makes and with different sizes and disposition of the parts to which the attachment is to be secured.

Another object of the present invention is to provide an indicator control which, when moved into an operative position, is permitted to return to its normal, inoperative position, only under condition that the associated steering mechanism is in normal position with the vehicle driving straight forward.

The present disclosure therefore features an arrangement of signal control whereby the operator may pre-indicate the direction in which the vehicle is about to turn and if this is followed by the actual turning of the vehicle the indicator signal will continue to function automatically as long as the vehicle is moving in the indicated direction and no act on the part of the operator except the steering operation will cause the indicator to become inoperative.

Another object of the invention is to provide, in a device of the class described, a simplified arrangement for insuring the automatic restoration of the signals to their normal inoperative positions, and without any volition to this effect on the part of the operator when the vehicle assumes its straight forward travelling direction.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a vertical sectional view taken through the upper part of a vehicle steering column of a fixed casing type, showing a preferred embodiment of the invention installed thereon; and also showing diagrammatically a signalling device with necessary electrical connection;

Figures 2 and 3 are each transverse sectional views taken respectively on the lines 2—2 and 3—3 looking in the directions indicated by the arrows;

Figure 4 is a detailed perspective view of the hand grip shown in Figure 1; and

Figure 5 is a view of part of a steering column of the rotary casing type, together with associated parts of the instrument board and showing a modified form of the invention installed thereon.

In the following description and in the claims, parts will be identified by specific names for convenience of expression but they are intended to be as generic in their application to similar parts as the art will permit.

In the drawings there is shown part of a steering mechanism 10 and which in the showing in Figure 1 includes a fixed outer casing 11 and in the disclosure in Figure 5 including a rotatably mounted outer casing 12. In each instance the vehicle is steered through the steering wheel 13 which includes the hand engaging rim 14 and in all other respects it is to be assumed that the disclosure as thus far described is conventional.

It is a feature of this disclosure that the signal controlling parts are to be manufactured and sold as complete articles of manufacture and are designed to be mounted on the different makes of vehicles now in general use without, or with the least possible demounting or change in structural parts.

It will be assumed that the associated vehicle is provided with some suitable form of direction indicators, herein shown to be of an electrically actuated type and controlled selectively by a circuit closer or switch 15 secured in the form shown in Fig. 1, by means of a mounting strap 16 to the fixed tube 11, or secured directly to the instrument board 16, as disclosed in the modified showing in Fig. 5. There is shown diagrammatically in Figure 1 a left indicating signal 17, a right indicating signal 18 connected respectively by conductors 19 and 20 with the circuit closer 15 and supplied from a suitable source of electric energy such as the battery 21.

It will be further assumed that the circuit closer 15 is provided with an upstanding switch lever 22, spring controlled, to maintain the same normally in an upright, inoperative position and designed to be moved, as indicated by the dotted lines in Figure 1 in one direction to close the circuit through the signal 17 and in the opposite direction to close the circuit through the signal 18.

Referring specifically to the mechanism for shifting the switch lever and which mechanism specifically constitutes a feature of this disclosure, it is intended that the same be marketed as a complete unit designed to be adjusted and installed on any form of steering handle.

Referring to the showing in Figure 1, there is disclosed a split guide ring 23 which encircles the hub 18 of the casing 11 and is centered thereon by means of spacing screws 24. In the disclosure in Figure 5, the guiding ring 23 is secured to the rotating casing 12 by means of screws 25. The guiding ring 23 provides on its outer side an annular bearing for a split cam ring 26, mounted therein for rotary movement about the axis of the steering column. The under surface of the cam ring is provided at its outer edge with a depending split rim 27, the ends of which rim are spaced apart to form an idling space 28. The parts are so apportioned and positioned that the switch lever 22 extends into this space when in its normal inoperative position with the circuits in open position, as shown in full lines in Figures 1 and 2. The adjacent ends of the rim 27 are bevelled in the same general direction with reference to a tangent to the circle of rotation so as to form straight face cams 29 and 30 on opposite sides and facing the switch lever. The outer peripheral face of the rim 27 forms a locking face 31 for the lever when shifted on to the rim by the cam 30, and similarly the inner peripheral face 32 of the rim 27 provides a locking surface for securing the switch lever against accidental return to normal when shifted by the cam 29.

When the vehicle is driving forwardly and no signal acting, the cam ring is maintained in position with both cams in spaced relation to the switch lever by means of a pair of springs 33 and 34 with their inner ends bearing on a stop 35 constituting part of the cam ring and their outer ends engaging projections 36 and 37 projecting radially from the guide ring 23.

The cam ring is controlled in its shifting movement by means of a hand grip or handle 38 connected to the ring by means of a radially extending arm 39. Preferably the handle 38 is curved to conform to the configuration of the rim 14 and is preferably open on its inner side and made of resilient metal so that it may spring over the rim.

When so mounted the handle constitutes in effect part of the portion of the ring grasped by the operator incidental to the act of steering the vehicle and in this respect is another illustration of the invention defined in the copending application.

In order to accommodate the attachment to wheels having different radii it is herein suggested that the arm 39 be made adjustable in length and in the showing in Fig. 1 made of two telescoping parts secured in adjusted position by a set screw 40.

In the form of the invention disclosed in Figure 5 where the circuit closer is spaced from the steering wheel, means are provided for reaching from the handle to the cam ring mounted close to the circuit closer on the instrument board. The handle 38 is connected to the cam ring through the arm 39 which in this case is in the form of a lever 41 carried on the underside of one of the spokes 42 of the wheel 13. The inner end of the lever is pivotally connected to a rocking rod 43, which is mounted for rotary movement in straps 44 carried by the casing 12. The lower end of the rod 43 is offset and inturned to form a finger 45 engaging in a recess 46 formed in the outer face of the cam ring 26. From this construction it will be apparent that the shifting of the handle 38 to the right or left will correspondingly shift the cam ring 26 in a manner similar to the direct shifting of the cam ring in the form shown in Figure 1.

In operation and assuming that the vehicle is being driven straight forwardly, when the parts are in the position shown in the several figures and neither of the indicating signals are functioning; suppose that it is the intent of the operator to turn in either one or the other direction, such for instance, as a movement to the right. The operator will grasp the rim at the part containing the handle 38 and will move the hand to the right preliminary to or in the act of effecting the steering movement. The cam 29 will be moved into engagement with the shift lever 22 and bearing on the same will act to move the same transversely of the path of movement of the cam from the full line position shown in Figure 2 into the dotted line position shown at 47. This will act to shift the lever from the upright position shown in Figure 1 to the right inclined position and will react through the circuit closer to cause the right hand signal 18 to become operative.

If the operator releases tension on the handle 38 the springs 33 and 34 will react on the cam ring to shift the same back to its normal position and thus permit the switch lever to assume its normal, circuit breaking position and as a result the signal 18 will become inactive. However, should the operator follow the signal indication by the actuation of the steering mechanism, it will then mean that the guiding ring 23 will act through whichever spring may be compressed and thus cause a further travel of the cam ring into position to cause the switch lever to be in a position further removed from the opening between the cam and into the relative position indicated at 48 (Fig. 2). When in this position it will be apparent that even should the operator release his holding on the handle 38 and even though the springs tend to shift the cam ring back to normal relative to the guide ring, guide ring will be out of normal and the switch lever will still be held by the locking surface 32. In other words, the switch lever will be held in its circuit closing position and the signal will continue to function as long as the steering mechanism is out of its normal forward guiding position. When the steering mechanism is re-rotated to cause a forward drive of the vehicle, or as is usual when the steering wheel is held and the vehicle assumes its normal forward driving position with relation to the steering wheel, the idling space is shifted to its normal position and the switch lever is then free to assume its normal, inoperative upright position, shown in Figure 2.

The spacing of the cams from the lever, when in normal position, permits a slight shifting of the steering mechanism, such as would characterize the usual forward driving of a vehicle, and this slight shifting will have no effect upon the signals or other indicating mechanism controlled by the device herein disclosed.

It is obvious that the corresponding action will occur in connection with the left indicator as an incident to the operator's action in effecting a steering movement to the left.

By means of the device herein disclosed, it is possible to give the proper directional signal as an incident to the steering operation before the steering operation has actually commenced and in this way a sufficient time interval is obtained to warn the operator of a vehicle in rear and to give this rearwardly positioned operator a correct indication of the movement which the vehicle equipped with this device is about to make. Further it is possible to mount such a device on conventional automobile structures without necessity of demounting any of the structural parts or for using any tools other than a screw-driver. The device possesses certain fool-proof features in that after the vehicle has once started to turn in the indicated direction, the operator has no further control on the continued functional activity of the signal until the vehicle has again assumed its normal forward travel.

Having thus described our invention, we claim:

1. In a device of the class described, the combination of two control members each mounted for rotary movement about an axis, a resilient connection between the members for rotating one from the other, a circuit closer mounted in fixed position and including a shiftable control lever, one of said rotatable members including a cam operatively disposed to shift and lock the control lever in its shifted position, and the return of said shifted lever being operatively controlled by the position of the other control member.

2. In a vehicle, the combination with a steering column including a steering wheel, a guide ring adapted to be secured to the column, a cam ring rotatably mounted in the guide ring, a control handle adapted to be guided on the rim of the steering wheel and operatively connected to the cam ring to rotate the same, and mechanism operatively controlled by the rotation of the cam ring.

3. In a device of the class described, the combination of a steering wheel provided with a rim, a switch provided with a control lever, a cam adapted to be secured to the column of the wheel and operatively disposed to actuate the switch control lever, a handle for the cam movable circumferentially of the rim and having an adjustable connection with the cam whereby the handle may be adjusted to different diameters of steering wheels.

This specification signed this 20th day of June, 1923.

HOWARD J. MURRAY.

This specification signed this 20th day of June, 1923.

WALTER S. RUGG.